United States Patent
Wu

(10) Patent No.: US 6,874,524 B2
(45) Date of Patent: Apr. 5, 2005

(54) AIR VALVE CAPABLE OF PREVENTING AIR LEAKAGE WHEN A CONNECTION HEAD OF AN INFLATION DEVICE IS REMOVED

(76) Inventor: Hsin-Tsai Wu, 1F, No. 19, Alley 3, Lane 106, Sec. 3, Min-Chuan E. Rd., Taipei City (TW)

( * ) Notice: Subject to any disclaimer, the term of this patent is extended or adjusted under 35 U.S.C. 154(b) by 437 days.

(21) Appl. No.: 10/073,356

(22) Filed: Feb. 13, 2002

(65) Prior Publication Data

US 2003/0150487 A1 Aug. 14, 2003

(51) Int. Cl.[7] .................. F16K 15/20; F16K 31/528
(52) U.S. Cl. .................................... 137/223; 251/340
(58) Field of Search .......................... 137/223; 251/325, 251/340, 341, 346, 347

(56) References Cited

U.S. PATENT DOCUMENTS

| | | | | |
|---|---|---|---|---|
| 580,118 A | * | 4/1897 | Schrader | 251/347 |
| 763,643 A | * | 6/1904 | Stoddard | 251/340 |
| 955,859 A | * | 4/1910 | Galvin | 251/340 |
| 988,017 A | * | 3/1911 | Neumeyer | 251/340 |
| 1,158,420 A | * | 10/1915 | Schweinert | 251/347 |
| 1,721,518 A | * | 7/1929 | Larzelere | 251/340 |
| 2,125,554 A | * | 8/1938 | Franck | 251/340 |
| 2,600,976 A | * | 6/1952 | Dalrymple | 251/347 |
| 2,824,570 A | * | 2/1958 | Silverman et al. | 137/223 |
| 2,865,596 A | * | 12/1958 | Monnig | 251/340 |
| 3,043,558 A | * | 7/1962 | Napier | 251/340 |
| 4,872,643 A | * | 10/1989 | Lo | 251/340 |

* cited by examiner

*Primary Examiner*—John Rivell
(74) *Attorney, Agent, or Firm*—Morgan Lewis & Bockius LLP

(57) ABSTRACT

In an air valve for an inflatable object, a valve body is connected sealingly to the inflatable object and defines an air passage in fluid communication with an interior of the inflatable object. A movable member is disposed within the air passage and is adapted to connect with a connection head of an inflation device. A rotary member is rotatable to bring the movable member to one of an open position and a sealing position to permit or stop air flow through the air passage.

5 Claims, 5 Drawing Sheets

AIR VALVE CAPABLE OF PREVENTING AIR LEAKAGE WHEN A CONNECTION HEAD OF AN INFLATION DEVICE IS REMOVED

BACKGROUND OF THE INVENTION

1. Field of the Invention

The invention relates to a valve for an inflatable device, more particularly to an air valve that is capable of preventing air leakage when a connection head of an inflation device is removed therefrom.

2. Description of the Related Art

FIG. 1 shows a conventional valve 91 mounted on an inflatable object 92, such as an inflatable cushion, to inflate and deflate the inflatable object 92. The valve 91 includes a hollow valve seat 93 coupled to the inflatable object 92, and a valve cap 95 that is connected to the valve seat 93 via a connecting strip 94 and that has an internal thread portion 951 for engaging an external thread portion 931 of the valve seat 93. After inflation of the inflatable object 92, the valve cap 95 is sleeved on the external thread portion 931 to prevent leakage of air from the inflatable object 92 via the valve seat 93.

During the actual process of inflation, a connection head (not shown) of an inflation device, such as an air compressor (not shown), is connected to the valve seat 93. When the inflatable object 92 has been inflated to a desired extent, the connection head has to be detached from the valve seat 93 to allow closing of the valve seat 93 using the valve cap 95. At that interval of time, some of the air will escape from the inflatable object 92. To minimize the undesirable escape of air from the inflatable object 92, the user has to close the valve cap 95 very quickly, which is quite annoying.

SUMMARY OF THE INVENTION

Therefore, the main object of the present invention is to provide an air valve for an inflatable object, which can effectively prevent air leakage when a connection head of an inflation device is removed therefrom.

Accordingly, an air valve of the present invention includes:

a rigid, tubular valve body adapted to be disposed fixedly on the inflatable object and defining an air passage that has a front portion and a rear portion;

a sealing member disposed fixedly within the front portion of the air passage of the valve body;

a rotary member disposed rotatably on the valve body in such a manner to prevent forward and rearward movement of the rotary member relative to the valve body; and a rigid, tubular movable member disposed movably and non-rotatably within the rear portion of the air passage and having a rear end opening that is adapted to be in fluid communication with a connection head of an inflation device in such a manner that the connection head is press fitted within the opening, and a front end wall that is formed with an aperture unit, through which the opening is in fluid communication with the air passage in the valve body, the aperture unit being aligned with the sealing member, the movable member being connected to the rotary member so that, when the rotary member rotates on the valve body, the movable member can move within the air passage between a sealing position, where the front end wall of the movable member abuts against the sealing member so as to close the aperture unit such that air flow between the opening in the movable member and the air passage in the valve body is stopped, and an open position, where the front end wall of the movable member is spaced apart from the sealing member so as to open the aperture unit in the movable member, thereby permitting air flow between the opening in the movable member and the air passage in the valve body.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
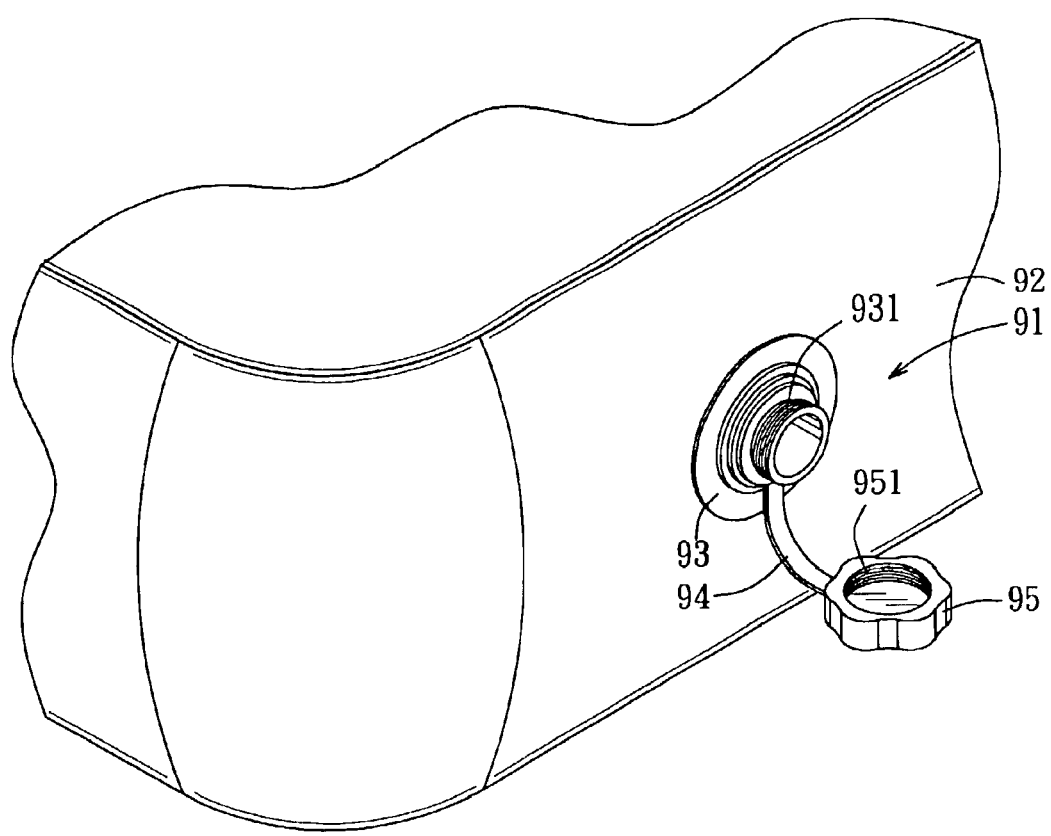
FIG. 1 is a perspective view of a conventional air valve when mounted on an inflatable object.
Figure 2:
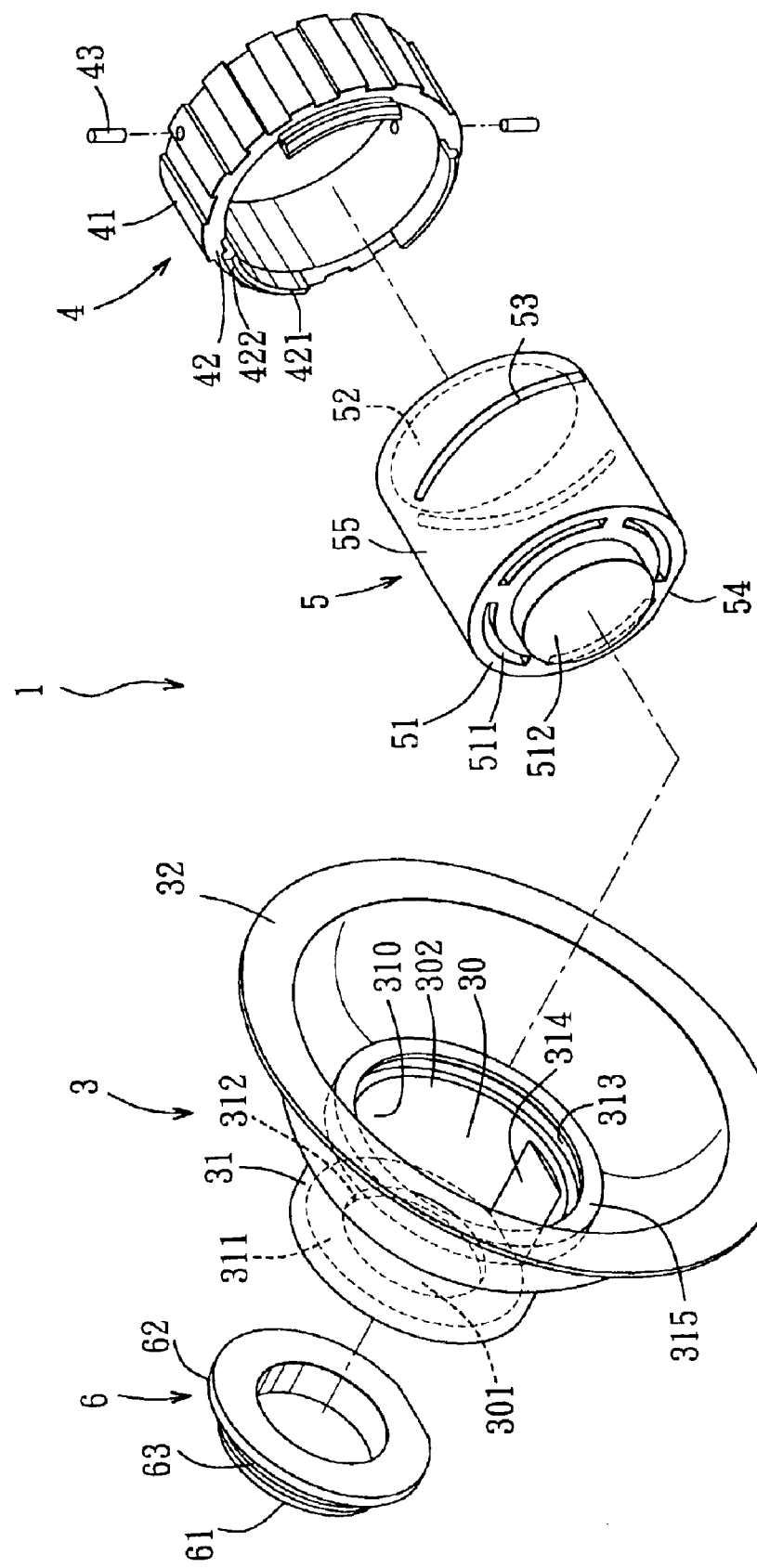
FIG. 2 is an exploded perspective view of the first preferred embodiment of an air valve according to the present invention.
Figure 3:
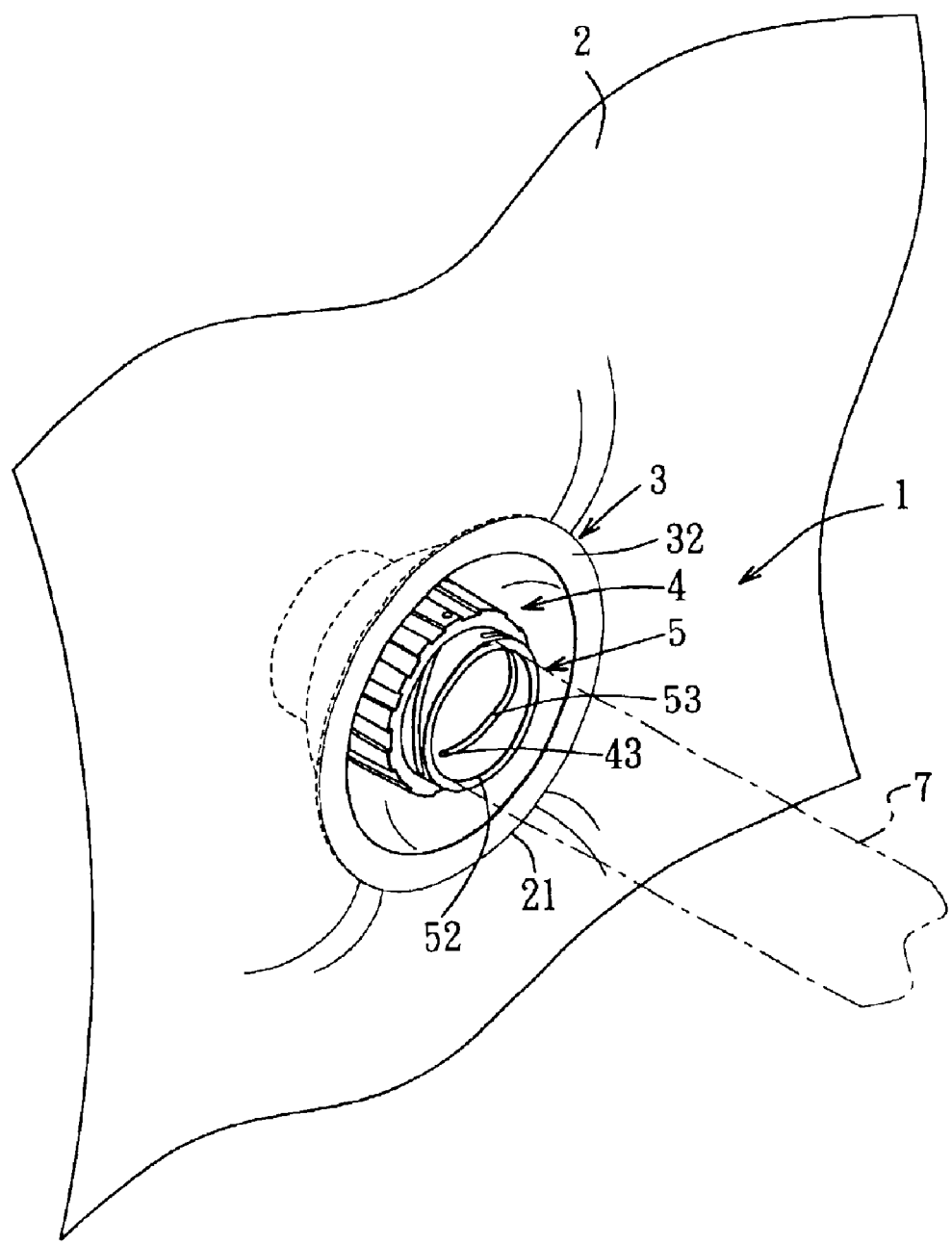
FIG. 3 is a perspective view of the first preferred embodiment when mounted on an inflatable object.

Referring to FIGS. 2 and 3, the first preferred embodiment of an air valve 1 according to the present invention is adapted for mounting within an opening 21 in an inflatable object 2, which is exemplified as an air cushion herein, for inflation and deflation of the same, and is shown to include a tubular valve body 3, a rotary member 4, a tubular movable member 5, and a sealing member 6. The valve body 3, which is formed from a rigid plastic material, defines an air passage 30 that has a front portion 301 and a rear portion 302 and that is in fluid communication with a hollow interior of the inflatable object 2, and includes a generally circular tubular portion 31 and a bowl-shaped connecting portion 32 extending radially and outwardly from the circular tubular portion 31. The connecting portion 32 is connected fixedly and sealingly to the inflatable object 2 in a known manner. The circular tubular portion 31 has an inner surface 310, which includes a front end inward flange 311 with an inner periphery 312, an annular groove 313, a flat surface portion 314 disposed between the annular groove 313 and the front end inward flange 311, and an annular rear end surface 315.

The sealing member 6 is disposed fixedly within the front portion 301 of the air passage 30 of the valve body 3. In this embodiment, the sealing member 6 is in the form of a separate annular gasket made of rubber and having an outer surface provided with front and rear end flanges 61, 62, and an annular groove 63 disposed between the front and rear end flanges 61, 62 and engaging fittingly with the inner periphery 312 of the front end inward flange 311.

The rotary member 4, which is shaped as a ring and which is formed from a plastic material, is disposed rotatably on the valve body 3 such that the rotary member 4 is prevented from forward and rearward movement relative to the valve body 3. In this embodiment, the rotary member 4 has an annular front end surface 42 disposed to abut against the rear end surface 315 of the circular tubular portion 31, and a plurality of flanges 421 that extend integrally and forwardly from the front end surface 42 and that are inserted into the circular tubular portion 31 of the valve body 3. Furthermore, the rotary member 4 is formed with a plurality of circumferentially extending integral ribs 422 that extend respectively, radially and outwardly from the flanges 421, and that are received slidably within the annular groove 313 in the valve body 3 so as to permit rotation of the rotary member 4 relative to the valve body 3 while preventing forward and rearward movement of the rotary member 4 relative to the valve body 3. In addition, the rotary member 4 has an outer wall surface formed with a plurality of radial ribs 41 to facilitate turning of the rotary member 4.

The movable member 5 is formed from a rigid plastic material, and is disposed movably and non-rotatably within the circular tubular portion 31 of the valve body 3 and at the rear portion 302 of the air passage 30. The movable member 5 has a rear end opening 52 and a circular front end wall 51. The rear opening 52 is adapted to be in fluid communication with a connection head 7 of an inflation device (not shown) for inflation and deflation of the inflatable object 2 in such a manner that the connection head 7 is press fitted within the opening 52. The front end wall 51 is formed with a cylindrical neck 512 at a central portion thereof, and an aperture unit 511. The aperture unit 511 is aligned with the sealing member 6, and permits fluid communication between the opening 52 and the air passage 30 in the valve body 3. In this embodiment, the aperture unit 511 includes a plurality of circumferentially extending apertures disposed around the cylindrical neck 512. The movable member 5 is connected to the rotary member 4 so that, when the rotary member 4 rotates on the valve body 3, the movable member 5 can move within the air passage 30 between a sealing position shown in FIG. 5, where the front end wall 51 of the movable member 5 abuts against the sealing member 6 so as to close the aperture unit 511 such that air flow between the opening 52 in the movable member 5 and the air passage 30 in the valve body 3 is stopped, and an open position shown in FIG. 4, where the front end wall 51 of the movable member 5 is spaced apart from the sealing member 6 so as to open the aperture unit 511 in the movable member 5, thereby permitting air flow between the opening 52 in the movable member 5 and the air passage 30 in the valve body 3. When the movable member 5 is disposed at the sealing position, the cylindrical neck 512 extends into and is press fitted within the sealing member 6, thereby establishing an air-tight seal between the neck 512 and the sealing member 6.

Furthermore, the movable member 5 has a cylindrical surrounding wall 55 which is formed with two curved slide slots 53, each of which has two closed ends. The rotary member 4 is sleeved rotatably on the movable member 5, and includes two fixed pushpins 43 that extend radially and inwardly therefrom and that are received respectively and slidably within the slide slots 53 in the movable member 5 so as to move the movable member 5 within the air passage 30 in the valve body 3 when the rotary member 4 rotates about the movable member 5. The movable member 5 is disposed at the sealing position when the pins 43 are moved to the rear ends of the slide slots 53, and are disposed at the open position when the pins 43 are moved to the front ends of the slide slots 53. The surrounding wall 55 has a flat outer surface 54 that engages the flat surface portion 314 of the valve body 3 to thereby prevent rotation of the movable member 5 within the valve body 3.

Figure 4:
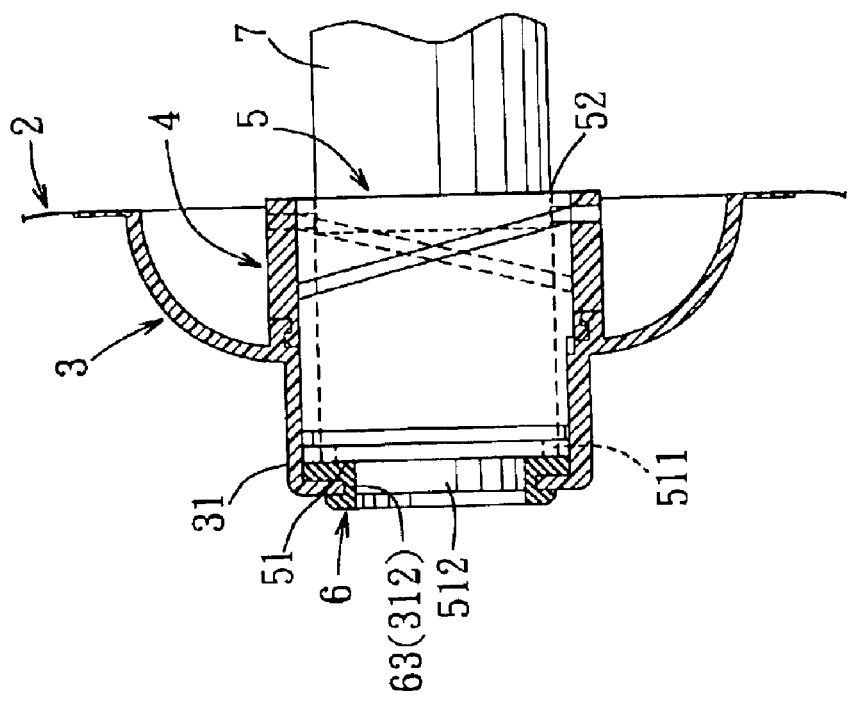
FIG. 4 is a sectional view to illustrate a movable member of the first preferred embodiment in an open position.
Figure 5:
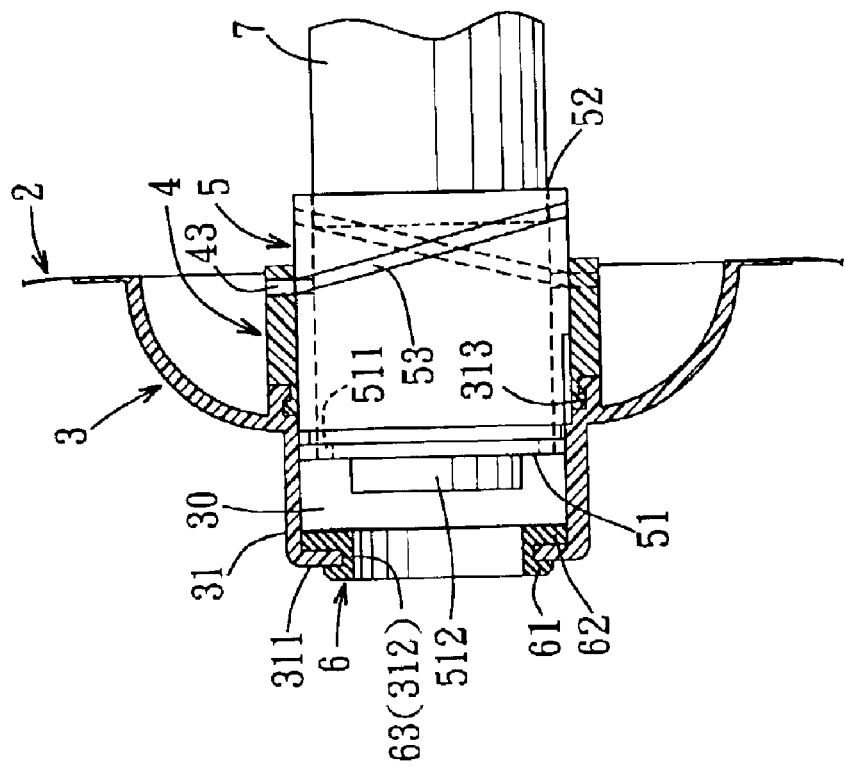
FIG. 5 is a sectional view to illustrate the movable member of the first preferred embodiment in a sealing position.

Referring to FIG. 4, in use, when it is desired to inflate or deflate the inflatable object 2, the front end wall 51 of the movable member 5 is caused to be spaced apart from the sealing member 6, so that air can enter into or escape from the interior of the inflatable object 2 via the aperture unit 511, the air passage 30, and the opening 52. To seal the path of air through the air passage 30, the rotary member 4 is turned so that the movable member 5 moves forwardly within the air passage 30 until the front end wall 51 of the movable member 5 abuts against the sealing member 6 and the cylindrical neck 512 is within the sealing member 6, thereby closing the aperture unit 511 and stopping air flow between the air passage 30 and the opening 52. As such, an air-tight seal is established between the movable member 5 and the circular tubular portion 31 of the valve body 3 so that the connection head 7 of the inflation device can be removed from the movable member 5, thereby preventing air leakage from the inflatable object 2 via the opening 21.

Figure 6:
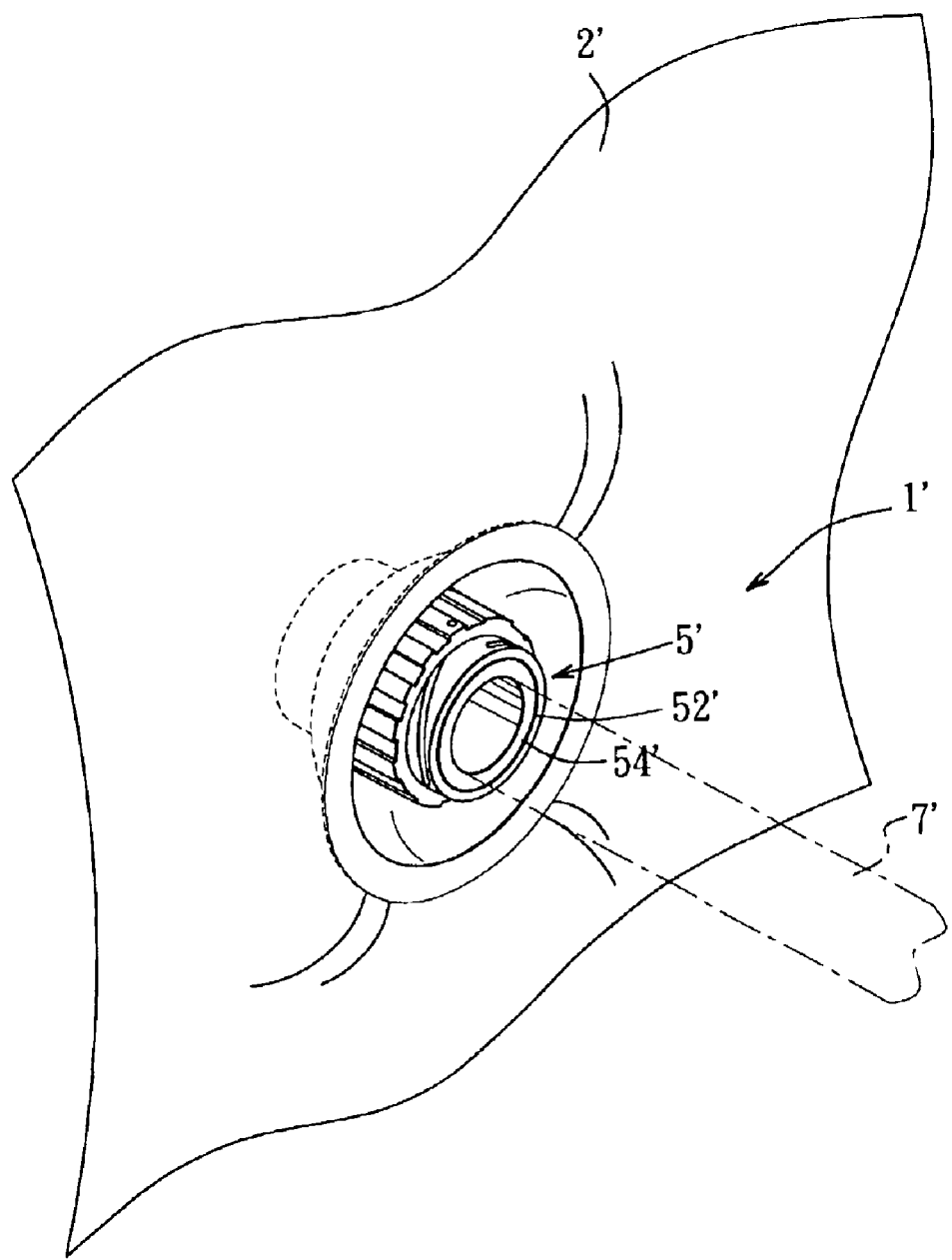
FIG. 6 is a perspective view of the second preferred embodiment of an air valve according to the present invention when mounted on an inflatable object.

FIG. 6 illustrates the second preferred embodiment of an air valve 1' according to the present invention. This embodiment is essentially the same as the previous embodiment, the only difference residing in that the air valve 1' further includes a tubular connector 54' that is press-fitted into an opening 52' in a movable member 5' and that is adapted to be connected to a small-diameter connection head 7' of an inflation device (not shown) for inflation and deflation of an inflatable object 2', thereby providing greater facility. It is noted that tubular connectors of other suitable shapes and sizes can be adopted depending on the user's needs.

In the present invention, after the inflatable object has been duly inflated, the rotary member can be operated to bring the movable member to the sealing position so as to positively close the path of air, with the air valve still connected to the connection head of the inflation device. Hence, there is no undesirable leakage of air when the connection head is removed.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An air valve for an inflatable object, said air valve comprising:

a rigid, tubular valve body adapted to be disposed fixedly on the inflatable object and defining an air passage that has a front portion and a rear portion;

a sealing member disposed fixedly within said front portion of said air passage of said valve body;

a rotary member disposed rotatably on said valve body in such a manner to prevent forward and rearward movement of said rotary member relative to said valve body; and a rigid, tubular movable member disposed movably and non-rotatably within said rear portion of said air passage and having a rear end opening that is adapted to be in fluid communication with a connection head of an inflation device in such a manner that the connection head is press fitted within said opening, and a front end wall that is formed with an aperture unit, through which said opening is in fluid communication with said air passage in said valve body, said aperture unit being aligned with said sealing member, said movable member being connected to said rotary member so that, when said rotary member rotates on said valve body, said movable member can move within said air passage between a sealing position, where said front end wall of said movable member abuts against said sealing member so as to close said aperture unit such that air flow between said opening in said movable member and said air passage in said valve body is stopped, and an open position, where said front end wall of said movable member is spaced apart from said sealing member so as to open said aperture unit in said movable member, thereby permitting air flow between said opening in said movable member and said air passage in said valve body, wherein said valve body includes a generally circular tubular portion, which has an inner surface that is formed with an annular groove, said rotary member being shaped as a ring, being made of a plastic material, and being formed with a plurality of circumferentially extending integral ribs that are received slidably within said annular groove in said valve body so as to permit rotation of said rotary member relative to said valve body while preventing forward and rearward movement of said rotary member relative to said valve body.

2. An air valve for an inflatable object, said air valve comprising:

a rigid, tubular valve body adapted to be disposed fixedly on the inflatable object and defining an air passage that has a front portion and a rear portion;

a sealing member disposed fixedly within said front portion of said air passage of said valve body;

a rotary member disposed rotatably on said valve body in such a manner to prevent forward and rearward movement of said rotary member relative to said valve body; and a rigid, tubular movable member disposed movably and non-rotatably within said rear portion of said air passage and having a rear end opening that is adapted to be in fluid communication with a connection head of an inflation device in such a manner that the connection head is press fitted within said opening, and a front end wall that is formed with an aperture unit, through which said opening is in fluid communication with said air passage in said valve body, said aperture unit being aligned with said sealing member, said movable member being connected to said rotary member so that, when said rotary member rotates on said valve body, said movable member can move within said air passage between a sealing position, where said front end wall of said movable member abuts against said sealing member so as to close said aperture unit such that air flow between said opening in said movable member and said air passage in said valve body is stopped, and an open position, where said front end wall of said movable member is spaced apart from said sealing member so as to open said aperture unit in said movable member, thereby permitting air flow between said opening in said movable member and said air passage in said valve body, wherein said valve body includes a generally circular tubular portion, which has an inner surface that is formed with an annular groove, said rotary member being shaped as a ring, being made of a plastic material, and being formed with a plurality of circumferentially extending integral ribs that are received slidably within said annular groove in said valve body so as to permit rotation of said rotary member relative to said valve body while preventing forward and rearward movement of said rotary member relative to said valve body, and wherein said rotary member has an annular front end surface, and a plurality of flanges that extend integrally and forwardly from said front end surface of said rotary member and that is inserted into said circular tubular portion of said valve body, said ribs extending respectively, radially and outwardly from said flanges, said circular tubular portion having an annular rear end surface that abuts against said front end surface of said rotary member.

3. An air valve for an inflatable object, said air valve comprising:

a rigid, tubular valve body adapted to be disposed fixedly on the inflatable object and defining an air passage that has a front portion and a rear portion;

a sealing member disposed fixedly within said front portion of said air passage of said valve body;

a rotary member disposed rotatably on said valve body in such a manner to prevent forward and rearward movement of said rotary member relative to said valve body; and a rigid, tubular movable member disposed movably and non-rotatably within said rear portion of said air passage and having a rear end opening that is adapted to be in fluid communication with a connection head of an inflation device in such a manner that the connection head is press fitted within said opening, and a front end wall that is formed with an aperture unit, through which said opening is in fluid communication with said air passage in said valve body, said aperture unit being aligned with said sealing member, said movable member being connected to said rotary member so that, when said rotary member rotates on said valve body, said movable member can move within said air passage between a sealing position, where said front end wall of said movable member abuts against said sealing member so as to close said aperture unit such that air flow between said opening in said movable member and said air passage in said valve body is stopped, and an open position, where said front end wall of said movable member is spaced apart from said sealing member so as to open said aperture unit in said movable member, thereby permitting air flow between said opening in said movable member and said air passage in said valve body, wherein said valve body includes a generally circular tubular portion, which has an inner surface that is formed with an annular groove, said rotary member being shaped as a ring, being made of a plastic material, and being formed with a plurality of circuniferentially extending integral ribs that are received slidably within said annular groove in said valve body so as to permit rotation of said rotary member relative to said valve body while preventing forward and rearward movement of said rotary member relative to said valve body, and wherein said inner surface of said circular tubular portion of said valve body is further formed with a flat surface portion, said movable member being shaped as a cylinder which is disposed movably within said circular tubular portion of said valve body and which has a flat outer surface that engages said flat surface portion of said valve body, thereby preventing rotation of said movable member within said valve body.

4. An air valve for an inflatable object, said air valve comprising:

a rigid, tubular valve body adapted to be disposed fixedly on the inflatable object and defining an air passage that has a front portion and a rear portion;

a sealing member disposed fixedly within said front portion of said air passage of said valve body;

a rotary member disposed rotatably on said valve body in such a manner to prevent forward and rearward movement of said rotary member relative to said valve body; and a rigid, tubular movable member disposed movably and non-rotatably within said rear portion of said air passage and having a rear end opening that is adapted to be in fluid communication with a connection head of an inflation device in such a manner that the connection head is press fitted within said opening, and a front end wall that is formed with an aperture unit, through which said opening is in fluid communication with said air passage in said valve body, said aperture unit being aligned with said sealing member, said movable member being connected to said rotary member so that, when said rotary member rotates on said valve body, said movable member can move within said air passage between a sealing position, where said front end wall of said movable member abuts against said sealing member so as to close said aperture unit such that air flow between said opening in said movable member and said air passage in said valve body is stopped, and an open position, where said front end wall of said movable member is spaced apart from said sealing member so as to open said aperture unit in said movable member, thereby permitting air flow between said opening in said movable member and said air passage in said valve body, wherein said front end wall of said movable member is circular, and is further formed with a cylindrical neck at a central portion thereof, said neck extending into and being press fitted within said sealing member, thereby establishing an air-tight seal between said neck and said sealing member when said movable member is disposed at said sealing position.

5. An air valve for an inflatable object, said air valve comprising:

a rigid, tubular valve body adapted to be disposed fixedly on the inflatable object and defining an air passage that has a front portion and a rear portion;

a sealing member disposed fixedly within said front portion of said air passage of said valve body;

a rotary member disposed rotatably on said valve body in such a manner to prevent forward and rearward movement of said rotary member relative to said valve body;

a rigid, tubular movable member disposed movably and non-rotatably within said rear portion of said air passage and having a rear end opening that is adapted to be in fluid communication with a connection head of an inflation device in such a manner that the connection head is press fitted within said opening, and a front end wall that is formed with an aperture unit, through which said opening is in fluid communication with said air passage in said valve body, said aperture unit being aligned with said sealing member, said movable member being connected to said rotary member so that, when said rotary member rotates on said valve body, said movable member can move within said air passage between a sealing position, where said front end wall of said movable member abuts against said sealing member so as to close said aperture unit such that air flow between said opening in said movable member and said air passage in said valve body is stopped, and an open position, where said front end wall of said movable member is spaced apart from said sealing member so as to open said aperture unit in said movable member, thereby permitting air flow between said opening in said movable member and said air passage in said valve body; and wherein said movable member has a cylindrical surrounding wall which is formed with a curved slide slot that has two closed ends, said rotary member being sleeved rotatably on said movable member and including a fixed push pin that extends radially and inwardly therefrom and that is received slidably within said slide slot in said movable member so as to move said movable member within said air passage in said valve body when said rotary member rotates about said movable member, said movable member being disposed at said sealing position when said pin is moved to one of said ends of said slide slot and at said open position when said pin is moved to the other one of said ends of said slide slot.

* * * * *